US011275721B2

(12) United States Patent
Scheuer et al.

(10) Patent No.: US 11,275,721 B2
(45) Date of Patent: Mar. 15, 2022

(54) ADAPTIVE TABLE PLACEMENT IN NUMA ARCHITECTURES

(71) Applicant: SAP SE, Walldorf (DE)

(72) Inventors: Tobias Scheuer, Bruchsal (DE); Iraklis Psaroudakis, St-Sulpice (CH); Abdelkader Sellami, Heidelberg (DE); Norman May, Karlsruhe (DE); Anastasia Ailamaki, Morges (CH)

(73) Assignee: SAP SE, Walldorf (DE)

( * ) Notice: Subject to any disclaimer, the term of this patent is extended or adjusted under 35 U.S.C. 154(b) by 645 days.

(21) Appl. No.: 14/802,580

(22) Filed: Jul. 17, 2015

(65) Prior Publication Data

US 2017/0017674 A1 Jan. 19, 2017

(51) Int. Cl.
*G06F 16/22* (2019.01)

(52) U.S. Cl.
CPC ................ *G06F 16/2282* (2019.01)

(58) Field of Classification Search
CPC ........................ G06F 17/30339; G06F 16/2282
USPC ........................................................ 707/812
See application file for complete search history.

(56) References Cited

U.S. PATENT DOCUMENTS

| | | | |
|---|---|---|---|
| 6,349,394 B1 * | 2/2002 | Brock ................... | G06F 11/302 709/249 |
| 6,457,100 B1 * | 9/2002 | Ignatowski ......... | G06F 12/0813 711/119 |
| 6,499,028 B1 * | 12/2002 | Brock ................. | G06F 11/3409 707/999.004 |
| 7,702,743 B1 * | 4/2010 | Wong .................. | G06F 12/1036 709/216 |
| 7,761,485 B2 * | 7/2010 | Papoutsakis .......... | G06F 16/217 707/812 |
| 8,692,834 B2 * | 4/2014 | Peterson .................... | G06T 1/60 345/505 |
| 8,752,058 B1 * | 6/2014 | Zheng ................. | G06F 9/45545 718/102 |
| 9,813,490 B2 * | 11/2017 | Idicula ..................... | H04L 67/10 |
| 2002/0062432 A1 * | 5/2002 | Bouraoui ............ | G06F 12/1072 711/203 |
| 2005/0125409 A1 * | 6/2005 | Day .................. | G06F 16/24542 |
| 2007/0027838 A1 * | 2/2007 | Newport ........... | G06F 16/90335 |
| 2008/0046895 A1 * | 2/2008 | Dillenberger ........... | G06F 9/505 718/105 |
| 2008/0133456 A1 * | 6/2008 | Richards ............... | G06F 16/217 |

(Continued)

OTHER PUBLICATIONS

Intel Xeon Processor E7 Family Uncore Performance Monitoring, 2011. http://www.intel.com/.

(Continued)

*Primary Examiner* — Ashish Thomas
*Assistant Examiner* — Nargis Sultana
(74) *Attorney, Agent, or Firm* — Klarquist Sparkman, LLP

(57) ABSTRACT

Techniques and solutions are provided for performing adaptive database table placement in a non-uniform memory access (NUMA) architecture. The adaptive table placement can occur in response to changing workloads on the NUMA nodes. For example, if a particular NUMA node is saturated, a database table may be moved from the memory of the saturated NUMA node to the memory of another NUMA node that is underutilized. In some cases, an entire database table is moved, while in other cases the database table is partitioned and only part of the table is moved.

20 Claims, 8 Drawing Sheets

(56) References Cited

U.S. PATENT DOCUMENTS

| | | | | |
|---|---|---|---|---|
| 2008/0319967 | A1* | 12/2008 | Hutchison | G06F 16/2471 |
| 2010/0217949 | A1* | 8/2010 | Schopp | G06F 9/5077 |
| | | | | 711/173 |
| 2011/0131328 | A1* | 6/2011 | Horman | G06F 12/0284 |
| | | | | 709/226 |
| 2011/0161943 | A1* | 6/2011 | Bellows | G06F 9/4843 |
| | | | | 717/149 |
| 2011/0247000 | A1* | 10/2011 | Eidus | G06F 9/50 |
| | | | | 718/104 |
| 2011/0282875 | A1* | 11/2011 | Atkins | G06F 16/24552 |
| | | | | 707/737 |
| 2012/0072627 | A1* | 3/2012 | Droux | G06F 9/505 |
| | | | | 710/104 |
| 2012/0174117 | A1* | 7/2012 | Jula | G06F 9/5088 |
| | | | | 718/105 |
| 2012/0296883 | A1* | 11/2012 | Ganesh | G06F 3/0608 |
| | | | | 707/693 |
| 2012/0330954 | A1* | 12/2012 | Sivasubramanian | |
| | | | | G06F 16/217 |
| | | | | 707/737 |
| 2013/0024646 | A1* | 1/2013 | Liu | G06F 30/33 |
| | | | | 711/206 |
| 2013/0067135 | A1* | 3/2013 | Pandey | G06F 9/5033 |
| | | | | 711/6 |
| 2013/0297557 | A1* | 11/2013 | Bhide | G06F 16/254 |
| | | | | 707/602 |
| 2014/0237069 | A1* | 8/2014 | Gray | G06F 9/5027 |
| | | | | 709/214 |
| 2015/0052287 | A1* | 2/2015 | Venkatasubramanian | |
| | | | | G06F 9/5083 |
| | | | | 711/6 |
| 2015/0089125 | A1* | 3/2015 | Mukherjee | G06F 16/2455 |
| | | | | 711/104 |
| 2015/0095287 | A1* | 4/2015 | Spyker | G06F 16/2365 |
| | | | | 707/648 |
| 2015/0248361 | A1* | 9/2015 | van Riel | G06F 13/1657 |
| | | | | 711/148 |
| 2015/0277779 | A1* | 10/2015 | Devarapalli | G06F 9/45558 |
| | | | | 711/162 |
| 2016/0070598 | A1* | 3/2016 | Vadkerti | G06F 9/5077 |
| | | | | 718/104 |
| 2016/0085571 | A1* | 3/2016 | Kim | G06F 9/48 |
| | | | | 718/1 |
| 2016/0092259 | A1* | 3/2016 | Mehta | G06F 12/0815 |
| | | | | 718/1 |
| 2016/0147820 | A1* | 5/2016 | Schreter | G06F 9/5016 |
| | | | | 707/693 |
| 2016/0171023 | A1* | 6/2016 | Konik | G06F 16/119 |
| | | | | 707/812 |
| 2016/0179884 | A1* | 6/2016 | Jerzak | G06F 16/2455 |
| | | | | 707/718 |
| 2016/0210049 | A1* | 7/2016 | van Riel | G06F 11/3037 |
| 2016/0357751 | A1* | 12/2016 | Li | G06F 16/41 |

OTHER PUBLICATIONS

Intel Xeon Processor E7 v2 2800/4800/8800—Datasheet—vol. 2, 2014. http://www.intel.com/.
SAP BW Enhanced Mixed Load benchmark, 2015. http://global.sap.com/campaigns/benchmark/.
SAP HANA Platform SQL and System Views Reference, 2015. http://help.sap.com.
A. Ailamaki et al. How to stop under-utilization and love multicores. In *SIGMOD*, pp. 189-192, 2014.
M.-C. Albutiu et al. Massively Parallel Sort-Merge Joins in Main Memory Multi-Core Database Systems. In *VLDB*, 5(10):1064-1075, 2012.
D. Alistarh et al. The SprayList: A Scalable Relaxed Priority Queue. In *PPoPP*, pp. 11-20, 2015.
C. Balkesen et al. Multi-Core, Main-Memory Joins: Sort vs. Hash Revisited. In *VLDB*, 7(1):85-96, 2013.
T. Becker et al. Searching for the Best System Configuration to Fit Your BW Needs?, Nov. 2012. http://scn.sap.com/docs/DOC-33705.
S. Blagodurov et al. A Case for NUMA-aware Contention Management on Multicore Systems. In *USENIX ATC*, pp. 557-558, 2011.
W. Chen et al. Architecting and Deploying DB2 with BLU Acceleration. *IBM Redbooks*, 2014.
TPC-H Benchmark Rev. 2.17.1. Nov. 2014. <http://www.tpc.org/tpc_documents_current_versions/pdf/tpch2.17.1.pdf>.
M. Dashti et al. Traffic Management: A Holistic Approach to Memory Placement on NUMA Systems. In *ASPLOS*, pp. 381-394, 2013.
F. Färber et al. The SAP HANA Database—An Architecture Overview. *IEEE Data Eng. Bull.*, 35(1):28-33, 2012.
J. Giceva et al. Deployment of Query Plans on Multicores. In *VEDB*, 8(3):233-244, 2014.
T. Gubner. Achieving Many-Core Scalability in Vectorwise. Master's thesis, TU Ilmenau, 2014.
T. Kissinger et al. ERIS: A NUMA-Aware In-Memory Storage Engine for Analytical Workloads. In *ADMS*, pp. 74-85, 2014.
T. Lahiri et al. Oracle Database In-Memory: A Dual Format In-Memory Database. In *ICDE*, 2015.
C. Lameter et al. NUMA (Non-Uniform Memory Access): An Overview. ACM Queue, 11 (7):40, 2013.
H. Lang et al. Massively Parallel NUMA-aware Hash Joins. In *IMDM*, 2013.
P.-A. Larson et al. Enhancements to SQL server column stores. In *SIGMOD*, pp. 1159-1168, 2013.
T. Legler et al. Data Mining with the SAP NetWeaver BI Accelerator. In *VLDB*, pp. 1059-1068, 2006.
V. Leis et al. Morsel-Driven Parallelism: A NUMA-Aware Query Evaluation Framework for the Many-Core Age. In *SIGMOD*, pp. 743-754, 2014.
C. Lemke et al. Speeding up queries in column stores: a case for compression. In *DaWaK*, 117-129, 2010.
Y. Li et al. NUMA-aware algorithms: the case of data shuffling. In *CIDR*, 2013.
S. Idreos et al. MonetDB: Two decades of research in column-oriented database architectures. *Data Engineering*, p. 40, 2012.
D. Porobic et al. ATraPos: Adaptive transaction processing on hardware Islands. In *ICDE*, pp. 688-699, 2014.
I. Psaroudakis et al. Task Scheduling for Highly Concurrent Analytical and Transactional Main-Memory Workloads. In *ADMS*, pp. 36-45, 2013.
I. Psaroudakis et al. Scaling Up Mixed Workloads: A Battle of Data Freshness, Flexibility, and Scheduling. In *TPCTC*, pp. 97-112, 2015.
V. Raman et al. DB2 with BLU Acceleration: So much more than just a column store. *VLDB*, 6(11):1080-1091, 2013.
P. Russom. Best Practices Report: High-Performance Data Warehousing, 2012. http://tdwi.org/.
M. Stonebraker et al. The end of an architectural era (it's time for a complete rewrite). In *VLDB*, pp. 1150-1160, 2007.
T. Willhalm et al. SIMD-Scan: Ultra Fast in-Memory Table Scan using on-Chip Vector Processing Units. In *VLDB*, vol. 2, pp. 385-394, 2009.
T. Willhalm et al. Vectorizing database column scans with complex predicates. In *ADMS*, pp. 1-12, 2013.
F. Wolf et al. Extending Database Task Schedulers for Multi-threaded Application Code. In *SSDBM*, Jun. 2015.
M. Zukowski et al. Vectorwise: Beyond Column Stores. *IEEE Data Eng. Bull.*, 35(1):21-27, 2012.

\* cited by examiner

ADAPTIVE TABLE PLACEMENT IN NUMA ARCHITECTURES

BACKGROUND

A non-uniform memory access (NUMA) architecture is made up of at least two sockets (a.k.a. NUMA nodes), where each socket has its own memory and processors. A processor in a NUMA architecture has local access to memory located on the same socket and remote access to memory located on other sockets. Thus, in NUMA architectures memory access time depends on the location of the memory relative to the processor accessing the memory.

NUMA architectures can also have NUMA nodes which consist of memory only, or processors only. In both cases all memory accesses are remote memory accesses, but with different latencies.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The technologies described herein can be used for adaptive placement of database tables in a NUMA architecture (e.g., database tables can be moved and/or partitioned). In some implementations, the technologies described herein are used to move frequently accessed database tables from saturated sockets to sockets that are underutilized. For example, moving frequently accessed database tables from saturated sockets to underutilized sockets can be performed by detecting a saturated socket, detecting the most frequently accessed table on that socket, and moving the table to another socket that is underutilized. In some implementations, the technologies described herein are used to partition database tables across more than one socket.

As described herein, a variety of other features and advantages can be incorporated into the technologies as desired.

DETAILED DESCRIPTION

Example 1

Overview

The following description is directed to techniques and solutions for adaptively placing database tables in a NUMA architecture.

In a database system, the concurrent memory access provided by a NUMA architecture can be exploited. By allocating database tables across the sockets, and by executing database tasks on sockets local to the database tables that the tasks access, multiple fast memory accesses can be performed on the sockets simultaneously.

However, the database system's workload can be skewed if some database tables are accessed more frequently than others. This can cause an imbalance in the work performed by each socket. Sockets with several frequently accessed tables can become overworked (i.e. saturated), while other sockets with infrequently accessed tables remain underutilized.

The technologies described herein can be used to move frequently accessed database tables from saturated sockets to sockets that are underutilized. For example, moving frequently accessed database tables from saturated sockets to underutilized sockets can be performed by detecting a saturated socket, detecting the most frequently accessed table on that socket, and moving the table to another socket that is underutilized.

In some scenarios, a single database table is responsible (or primarily responsible) for the saturation of a socket. In these scenarios, moving the table to another socket may not correct the imbalance in the workload (e.g., moving the table to a destination socket will just saturate the destination socket). The technologies described herein can be used to partition the table across more than one socket in order to improve utilization. If the access frequency of the partitioned table drops off, the number of sockets the table is partitioned across can be reduced until the table is consolidated on a single socket.

The technologies described herein can be applied to an in-memory database management system, such as the HANA database (HANA is a database platform provided by SAP®). The in-memory database management system can store the row store and the column store in socket memory. In some implementations, all data is resident in socket memory. In other implementations, only a portion of the data is resident in socket memory (e.g., frequently used and/or important data).

Example 2

Server Environments for Adaptive Database Table Placement

In any of the examples herein, a server environment can be provided for performing operations for adaptive database table placement.

Figure 1:
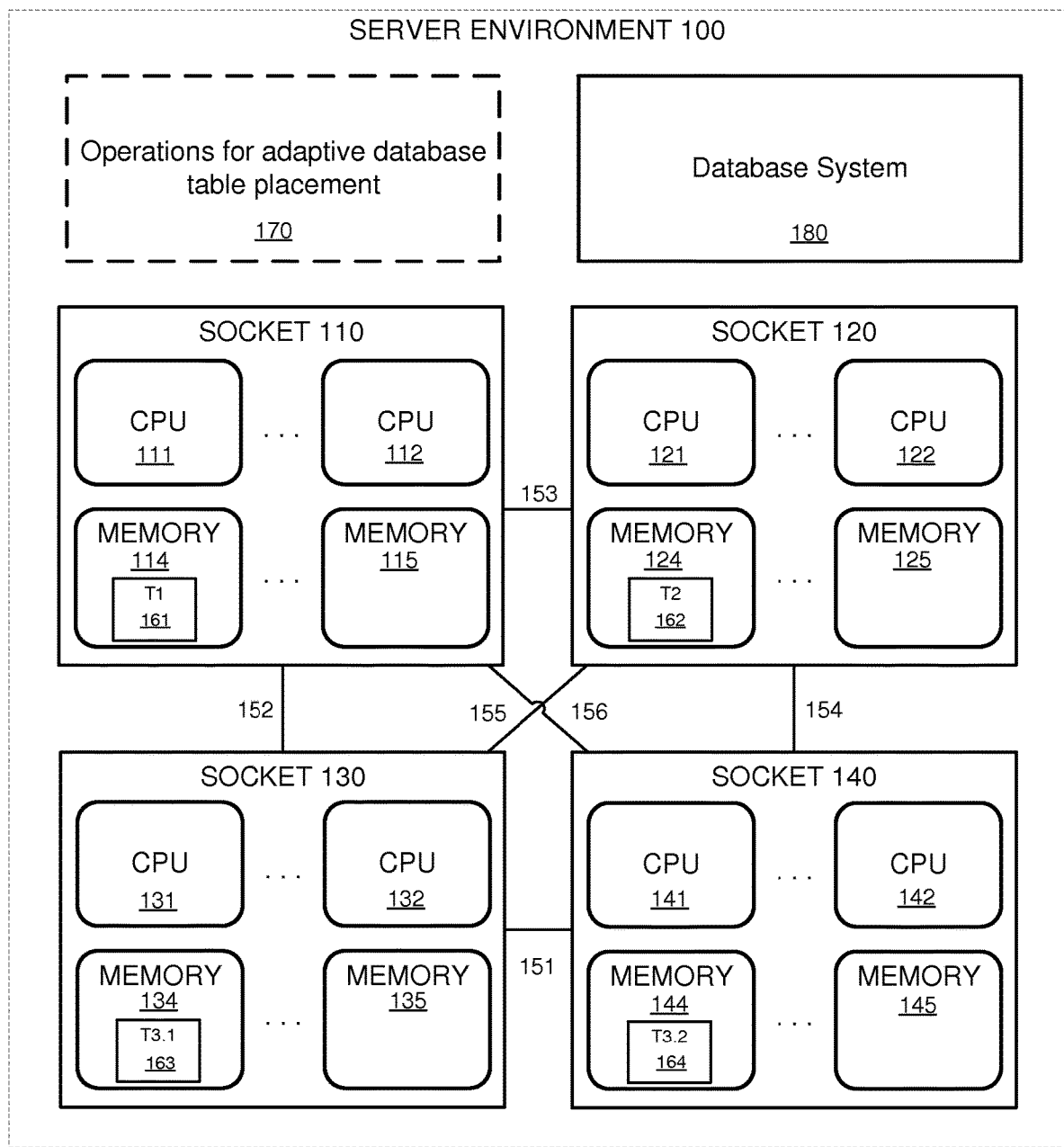
FIG. 1 is a diagram depicting an example server environment for performing adaptive database table placement in a NUMA architecture.

FIG. 1 is a diagram depicting an example server environment 100 for performing operations for adaptive database table placement 170 on tables (e.g. 161, 162, 163, and 164) managed by a database system (e.g. 180). The example server environment 100 includes sockets (a.k.a. NUMA nodes) 110, 120, 130, and 140. Each socket in example server 100 contains one or more central processing units (CPUs) and one or more units of memory. The example server environment 100 can implemented by various types of computing devices, such as computer servers, data storage systems, cloud computing resources, networking resources, etc.

A socket may contain multiple CPUs, a single CPU with multiple cores, or any combination thereof, including no CPUs at all in some implementations. A CPU can be a general-purpose processing unit, a processor in an application-specific integrated circuit (ASIC), or any other type of processor. A CPU can directly access memory located on the same socket as the CPU. For instance, example socket 110 comprises CPUs 111 through 112. Each of CPUs 111 through 112 is capable of directly accessing memory units 114 through 115 located on socket 110. Similarly, CPUs 121 through 122 on socket 120 are capable of directly accessing memory units 124 through 125, CPUs 131 through 132 on socket 130 are capable of directly accessing memory units 134 through 135, and CPUs 141 through 142 on socket 140 are capable of directly accessing memory units 144 through 145. Memory located on the same socket as a CPU that is accessing the memory may be referred to as "local memory." In general, a given socket can contain zero or more CPUs, each with one or more cores.

A CPU on a socket may also be capable of accessing memory on another socket. Memory located on a different socket from a CPU that is accessing the memory may be referred to as "remote memory." For instance, in FIG. 1, CPUs 111 through 112 on Socket 110 are capable of accessing memory 124 through 125 on socket 120 via communication channel 153. Communication channels between sockets (e.g., 151-156 in FIG. 1) may allow direct access to remote memory (e.g., Intel® QuickPath Interconnect, AMD HyperTransport™, or the like), indirect access to remote memory (e.g., front-side bus, network interface, or the like), or any combination thereof. Remote memory access may be performed with the same rate of access as local memory access, or remote memory access and local memory access may be performed at different rates of access.

A socket may contain one or more units of memory. For instance, socket 110 comprises memory units 114 through 115. Similarly, socket 120 comprises memory units 124 through 125, socket 130 comprises memory units 134 through 135, and socket 140 comprises memory units 144 through 145. Memory on a socket may be tangible memory, such as volatile memory (e.g., registers, cache, RAM), non-volatile memory (e.g., ROM, EEPROM, flash memory, etc.), or some combination of the two, virtual memory, or any combination thereof. In some implementations, a socket may access remote memory (e.g., using remote direct memory access (RDMA)). With RDMA, remote memory on another machine can be accessed directly using specific addresses, similar to accessing local memory, but with different latency.

Example server environment 100 also comprises a database system 180. Database system 180 may be an in-memory database management system, a database management system that employs a disk-storage mechanism, or any combination of the two. In some implementations, all data is resident in memory. In other implementations, only a portion of the data is resident in memory (e.g., frequently used and/or important data). Data in database system 180 is organized into one or more tables comprising one or more rows and/or one or more columns Tabular data is stored in a row-wise format, a column-wise format, or some combination thereof.

All or part of the tables of database system 180 can be stored in the memory of a socket. For instance, in FIG. 1, database table T1 161 is stored in memory unit 114 on socket 110. Similarly, database table T2 162 is stored in memory unit 124 of socket 120. Although FIG. 1 depicts T1 161 in a single memory unit, in some embodiments a table can be stored across multiple memory units on the same socket. Additionally, in some embodiments a database table can be stored in multiple memory units on different sockets. For instance, in FIG. 1, a database table T3 is stored in memory units of both socket 130 and socket 140. A portion of database table T3 (T3.1 163) is stored in memory unit 134 on socket 130. Another portion of database table T3 (T3.2 164) is stored in memory unit 144 on socket 140. T3.1 163 and T3.2 164 may contain separate sets of rows of database table T3, one or more columns of database table T3, portions of rows of database table T3, portions of columns of database table T3, or some combination thereof.

Example server environment 100 also comprises operations for adaptive database table placement 170. The operations for adaptive database table placement 170 can include any and all of the example methods described herein. The operations for adaptive database table placement 170 can be implemented in software, hardware, or a combination of the two. The operations for adaptive database table placement 170 may be performed by one or more socket CPUs, by one or more independent processors, or by a combination thereof. In some embodiments, the operations for adaptive database table placement 170 can be implemented as part of database system 180.

Example 3

Methods for Performing Adaptive Database Table Placement

In any of the examples herein, methods can be provided for performing adaptive placement of database tables stored in whole, or in part, in the memory of multiple NUMA nodes (a.k.a. sockets). For example, operations can be performed to move all or part of a database table from one NUMA node to another NUMA node based on certain criteria.

Figure 2:
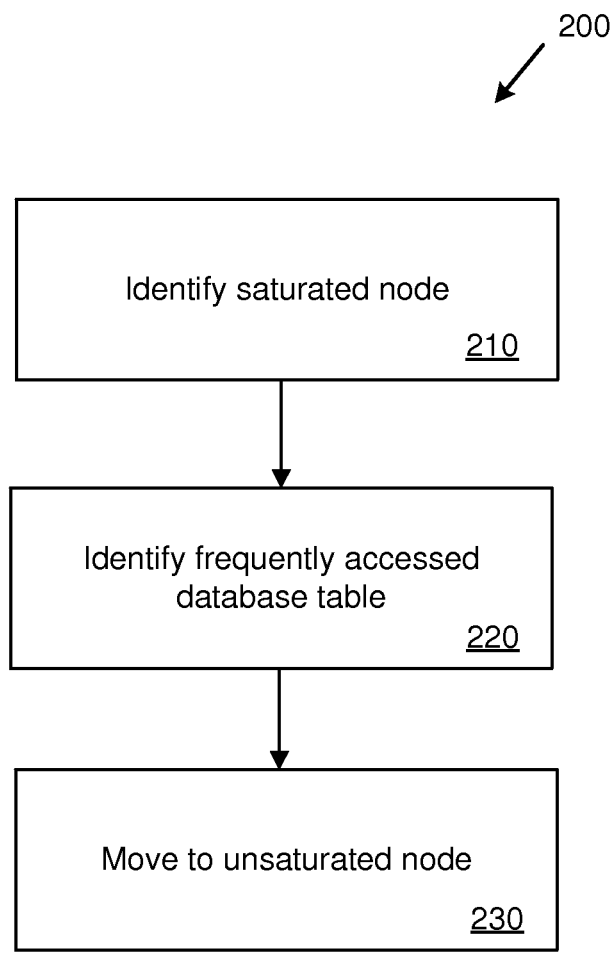
FIG. 2 is a flowchart of an example method for performing adaptive database table placement.

FIG. 2 is a flowchart of an example method 200 for moving a frequently accessed database table from a saturated NUMA node to an unsaturated NUMA node.

At 210, a saturated NUMA node is identified. In some embodiments, a saturated NUMA node may be a NUMA node with a computing resource utilization above a threshold value. For instance, the computing resource utilization may be memory bandwidth utilization, CPU utilization, etc. In some embodiments, multiple computing resource utilizations can used in combination. In some embodiments, the computing resource utilization may be determined based on hardware counters, counters implemented in software, or some combination thereof. The threshold value may represent a limit on acceptable operating conditions. In some embodiments, the threshold value may be constant, while in other embodiments it may be set dynamically. For instance, in one embodiment a NUMA node may be considered to be saturated when memory bandwidth utilization on the NUMA node has exceeded 90% of the maximum utilization.

In some embodiments, a NUMA node may be considered to be saturated when a computing resource utilization exceeds a threshold value for a specified period of time. For instance, a NUMA node may be identified as saturated when a computing resource utilization exceeds the threshold value for a number of milliseconds or seconds. In some embodiments, a saturated NUMA node is a NUMA node with the highest computing resource utilization when compared to other NUMA nodes (e.g., all other NUMA nodes) in a server environment.

At 220, a frequently accessed database table that is stored in whole, or in part, in the memory of the saturated NUMA node is identified. In some embodiments, a frequently accessed database table is a database table that is accessed by a database system more frequently than other tables that are also stored in whole, or in part, in the memory of the saturated NUMA node. For instance, a frequently accessed table may be the table stored in the memory of the saturated NUMA node that is involved in the highest number of table scans, aggregations, or the like. In some embodiments, the determination that a database table is frequently accessed is based on the number of times the table appears in a database system's plan cache, expensive statement report, or a combination thereof.

In at least some embodiments, a frequently accessed database table is identified by measuring recent computing resource utilization that is attributable to each database table that is stored on the saturated NUMA node. For instance, in an embodiment where a NUMA node is determined to be a saturated NUMA node because memory bandwidth utilization on the NUMA node has exceeded a threshold value, a frequently accessed table may be the table stored on the NUMA node with the highest recent average memory bandwidth utilization.

In some embodiments, the computing resource utilization of a table may be predicted based on the database operations that are currently being performed on the table and/or operations that are scheduled to be performed on the table. For instance, information about the average computing resource utilization of various types of database operations can be used, in conjunction with a list of current and/or scheduled operations for a table, to predict the computing resource utilization attributable to the table. In some embodiments, the average computing resource utilization for various database operations can be pre-computed upon start-up of a database system. For instance, upon start-up of a database system, various database operations (scans, aggregations, etc.) can be executed on a NUMA node in order to measure the average memory bandwidth utilization that the operations incur when accessing a table that is stored on the NUMA node. In some embodiments, such pre-computed memory bandwidth costs can be used to determine that a database table is a frequently accessed table.

At 230, the frequently accessed database table is moved to an unsaturated NUMA node. In some embodiments, the move may be accomplished by instructions executed by a processor on one of the NUMA nodes. For instance, in a server environment running the Linux operating system, the move_pages system call can be used to move memory pages containing the frequently accessed table from the saturated NUMA node to the unsaturated NUMA node. In other embodiments, instructions to move the frequently accessed table to an unsaturated NUMA node may be executed by a processor that is not located on one of the NUMA nodes. In other embodiments, the movement of the table may be accomplished by a hardware implementation.

In some embodiments, an unsaturated NUMA node is a NUMA node where a computing resource utilization has not exceeded a threshold value. For instance, if a saturated NUMA node is a NUMA node where memory bandwidth utilization on the NUMA node has exceeded 90% of its maximum value, then an unsaturated NUMA node may be a NUMA node where memory bandwidth utilization has not exceeded 90% of its maximum value. In other embodiments, an unsaturated NUMA node is a NUMA node where a computing resource utilization is below another threshold value. For instance, an unsaturated NUMA node may be a NUMA node where memory bandwidth utilization is below 25% of its maximum value. In another embodiment, an unsaturated NUMA node is the NUMA node that has a lowest computing resource utilization, compared to other NUMA nodes (e.g., all other NUMA nodes).

In some embodiments, the frequently accessed table may only be moved after it has qualified as a frequently accessed table for a threshold period of time. For instance, a frequently accessed database table may be moved only after it has been marked as a frequently accessed table on a saturated NUMA node for a period of milliseconds or seconds. In other embodiments, the move of the frequently accessed table may be scheduled to coincide with another database operation. For instance, the move of the frequently accessed database table may be scheduled to coincide with a planned rebuild of the frequently accessed table. In some embodiments, the planned rebuild of the frequently accessed table is configured so that the frequently accessed table will be rebuilt on an unsaturated NUMA node instead of the saturated NUMA node. In such a scenario, the frequently accessed database table is effectively moved to an unsaturated NUMA node without performing the move as a separate operation. As another example, the move of the frequently accessed database table can be scheduled to coincide with a table rewrite operation, such as a "delta merge" operation implemented within the HANA database.

In some embodiments, more than one saturated NUMA node may be identified. In those embodiments, method 200 may be repeated for each saturated NUMA node.

Figure 4A:
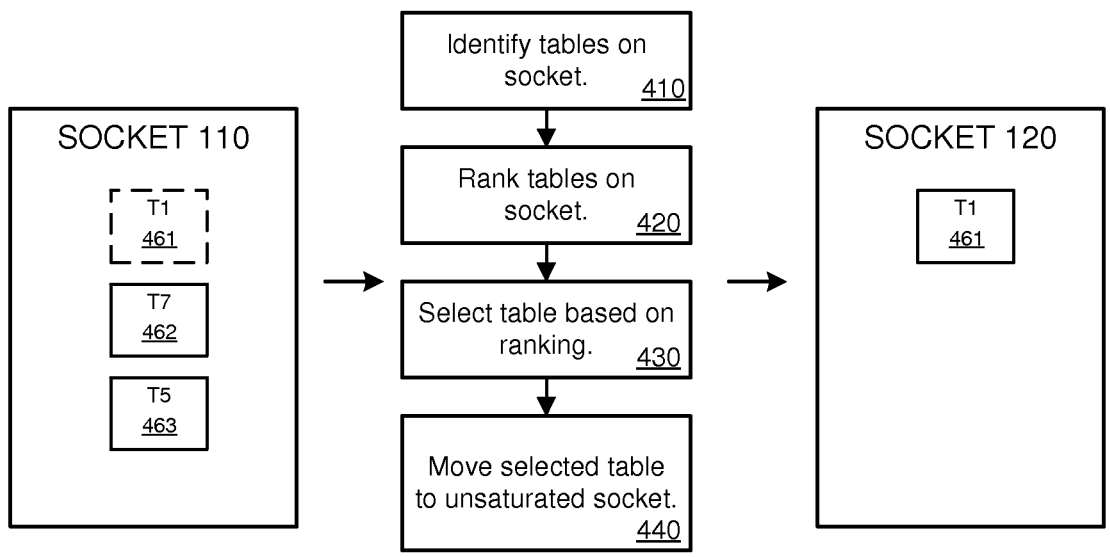
FIG. 4A is a flowchart of another example method for performing adaptive database table placement, and a diagram depicting an example server environment before and after the method is performed.

FIG. 4A is a flowchart of another example method for performing adaptive table placement, and a diagram depicting an example server environment before and after the method is performed. In FIG. 4A, socket 110 is saturated and socket 120 is unsaturated. At 410-430 method is depicted for identifying a frequently accessed table on a saturated socket.

At 410, all of the database tables that are stored, in whole or in part, on the saturated socket are identified. For instance, in the example server environment in FIG. 4A, database tables T1 461, T7 462, and T5 463 are stored in the memory of socket 110.

At 420, the database tables stored, in whole or in part, on the saturated socket are ranked. In some implementations, the database tables are ranked based on the number of times each table is accessed. In other implementations, the tables are ranked base on the amount of a computing resource utilization that is attributable to each table. For instance, the database tables can be ranked based on the portion of the saturated socket's memory bandwidth utilization that is attributable to each table. In other implementations, the tables are ranked based on the projected computing resource utilization of each table, the database operations currently being performed on each table, the database operations scheduled for each table, or a combination thereof.

At 430, a table stored in the memory of the saturated socket is selected based on ranking 420. In some implementations, where ranking 420 is based on the number of times each table is accessed, the most frequently accessed table is selected. In other implementations, where ranking 420 is based on the amount of a computing resource utilization that is attributable to each table, the table to which the greatest amount of the computing resource utilization is attributed is selected. For instance, in an implementation where ranking 420 is based on the portion of the saturated socket's memory bandwidth utilization that is attributable to each socket, the table to which the greatest amount of memory bandwidth utilization is attributed is selected. In the implementations described above, the database table that is ranked the highest is the table that is selected. In other implementations, the database table that is ranked the lowest can be the table that is selected. In the example server environment of FIG. 4A, tables T1 461, T7 462, and T5 463 are ranked at 420, and table T1 461 is selected based on the ranking at 430.

At 440, the selected database table is moved to an unsaturated socket. In the example server environment of FIG. 4A, table T1 461 is moved from saturated socket 110 to unsaturated socket 120, such that, after 440, table T1 461 is stored in the memory of socket 120 and tables T7 462 and T5 463 remain in the memory of socket 110.

Example 4

Method for Adaptively Moving and Partitioning Tables

In this section, an example method is described for providing adaptive table placement of a hot table by either moving the hot table to a cold socket or partitioning the hot table across multiple sockets. The techniques described in this section can be applied separately or in combination with techniques described elsewhere herein.

Figure 3:
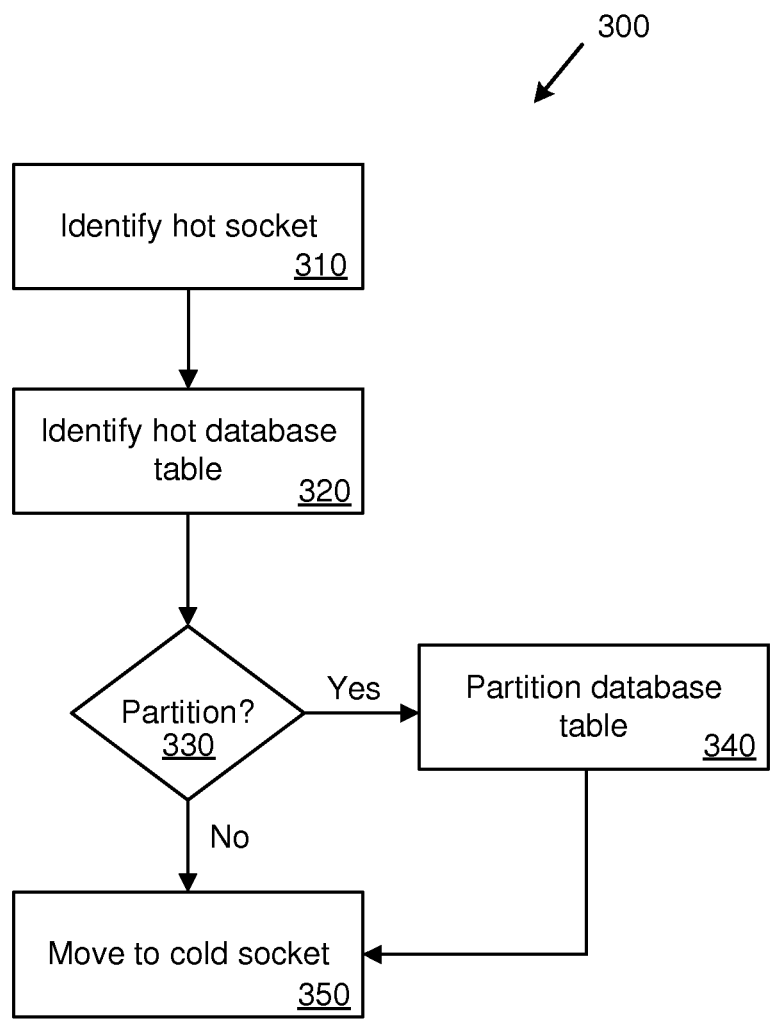
FIG. 3 is a flowchart of an example method for adaptively moving or partitioning a database table.

FIG. 3 is a flowchart of an example method 300 for performing adaptive placement of a hot database table by moving the hot table from a hot socket to a cold socket, or by partitioning the hot table and moving part of the hot table from the hot socket to the cold socket.

At 310, a hot socket is identified. In some embodiments, a hot socket is a socket that is saturated. In some embodiments, when more than one saturated socket is identified, a hot socket is defined as the socket that is the most saturated. For instance, if socket saturation is based on a computing resource that exceeds a threshold value, and more than one socket is saturated, the hot socket can be the socket with the computing resource utilization that is the highest. In other embodiments, the hot socket can be the socket with the computing resource utilization that is the lowest.

At 320, a hot database table that is stored in whole, or in part, in the memory of the hot socket is identified. In some embodiments, a hot database table may be a database table that is accessed by a database system more frequently than other tables that are also stored in whole, or in part, in the memory of the hot socket. For instance, a frequently accessed table may be a table stored in the memory of the hot socket that is involved in the highest number of table scans, aggregations, or the like. In some embodiments, a database table is determined to be frequently accessed based on the number of times the table appears in a database system's plan cache, expensive statement report, or a combination thereof.

In at least some embodiments, a hot database table is identified by measuring recent computing resource utilization that is attributable to each database table that is stored on the hot socket. For instance, in an embodiment where a socket is determined to be a hot socket because memory bandwidth utilization on the socket has exceeded a threshold value, a hot table may be the table to which the highest recent average memory bandwidth utilization can be attributed.

In some embodiments, the computing resource utilization of a database table may be predicted based on the database transactions that are currently being performed on the table and/or transactions that are scheduled to be performed on the table. For instance, information about the average computing resource utilization of various types of database transactions can be used, in conjunction with a list of current and/or scheduled transactions for a table, to predict the computing resource utilization for the table. In some embodiments, the average computing resource utilization for various database transactions can be pre-computed upon start-up of a database system. For instance, upon start-up of a database system, various database transactions (scans, aggregations, etc.) can be run on a socket where a table is stored in order to measure the average memory bandwidth utilization that the transactions incur when accessing the table. In some embodiments, such pre-computed memory bandwidth costs can be used to determine that a database table is a hot table.

At 330, a decision is made whether to move the hot table from the hot socket to a cold socket or to partition the hot table and move only a part of the hot table from the hot socket to a cold socket. In some embodiments, a hot table is partitioned if a high percentage of the hot socket's computing resource utilization can be attributed to operations involving the hot table. For instance, the decision may be made to partition the hot table if 90% of the hot socket's memory bandwidth utilization, CPU utilization, or a combination of the two is attributable to operations involving the hot table. In other embodiments, a hot table is partitioned if the hot table is accessed significantly more often than any other table stored on the hot socket. For instance, the decision may be made to partition the hot table if it is accessed three times more often than any other table stored on the hot socket.

If the decision was made at 330 to partition the hot table, then at 340 the hot table is partitioned. In some implementations, the hot table is partitioned using a row-wise partition wherein the hot table is partitioned by identifying a subset of the hot table's rows that will be moved to a cold socket. In some implementations, the hot table is partitioned using a column-wise partition, wherein the hot table is partitioned by identifying a subset of the hot table's columns that will be moved to a cold socket. In some implementations, partial columns and/or partial rows are partitioned.

At 350, the hot database table, or a part of the hot database table, is moved to a cold socket. If the decision was made at 330 to partition the hot table, then the part of the table identified at 340 is moved to a cold socket. If the decision was made at 330 not to partition the hot table, then at 350 the entire portion of the hot table that is stored on the hot socket is moved to a cold socket. The move of the identified portion of the hot table can be accomplished by instructions executed by a processor on one or more of the sockets, a processor that is not located on one of the sockets, by specific hardware, or some combination thereof.

In some embodiments, a cold socket is any socket that does not qualify as a hot socket. In other embodiments, a cold socket is a socket where a computing resource utilization is below a threshold value. In some embodiments, a cold socket is a socket that has the lowest computing resource utilization, compared to all of the other sockets. A cold socket may be a socket that is unsaturated. In some embodiments, when more than one unsaturated socket is identified, a cold socket can be defined as a socket that is the most unsaturated. For instance, if socket saturation is based on a computing resource utilization that exceeds a threshold value, and more than one socket's computing resource utilization is below the threshold value, a cold socket can be a socket with the computing resource utilization that is the lowest. In other embodiments, a cold socket can be a socket with the lowest average computing resource utilization over a period of time.

In some embodiments, the identified portion of the hot database table is moved only after the hot table has qualified as a hot table for a threshold period of time. In some embodiments, the move of the identified portion of the hot table may be timed to coincide with another database transaction, such as a scheduled reconstruction of the hot database table. In some embodiments, a previously scheduled reconstruction of the hot table can be adjusted so that the identified portion of the hot table will be reconstructed on a cold socket instead of the hot socket.

Figure 4B:
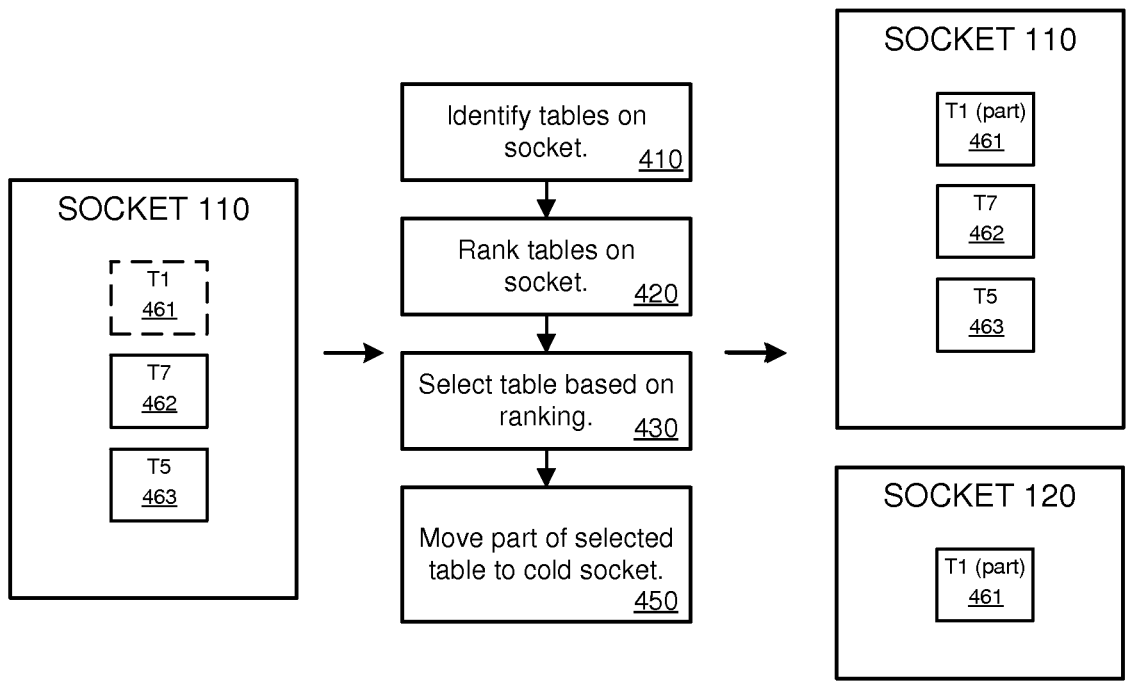
FIG. 4B is a flowchart of an example method for performing adaptive database table partitioning, and a diagram depicting an example server environment before and after the method is performed.

FIG. 4B is a flowchart of another example method for adaptively partitioning and moving a hot database table, and a diagram depicting an example server environment before and after the method is performed. In FIG. 4B, socket 110 is hot and socket 120 is cold. The operations at 410-430, described above, are used to identify a hot database table on a hot socket.

At 450, the selected database table is partitioned according to any one of the partitioning methods described herein. The partitioned part of the selected table is then moved to a cold socket. In the example server environment of FIG. 4B, table T1 461 is partitioned and a part of the table is moved from hot socket 110 to cold socket 120, while the remaining part of table T1 461 remains on socket 110.

Any of the methods described for partitioning a hot database table may be repeated so that, with each repetition, the hot table is partitioned across an increasing number of sockets. Such a repetition can be referred to as increasing the partition granularity of the database table. As used herein, increasing the partition granularity refers to increasing the number of partitions that the table is partitioned across. In some embodiments, the partition granularity of a hot database table is increased until the table no longer qualifies as a hot table. In some embodiments, the partition granularity of one or more database tables is increased until a socket is no longer hot, saturated, or both.

Example 5

Methods for Decreasing Table Partition Granularity

In this section, an example method is described for decreasing the partition granularity of a partitioned database table. As used herein, decreasing the partition granularity refers to decreasing the number of partitions that the table is partitioned across. The techniques described in this section can be applied separately or in combination with techniques described elsewhere herein.

Figure 5:
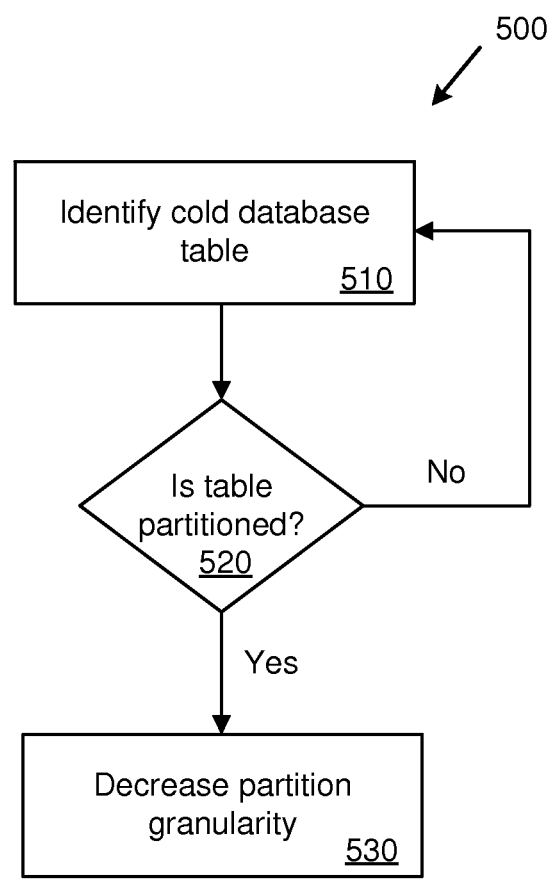
FIG. 5 is a flowchart of an example method for decreasing the partition granularity of a database table.

FIG. 5 is a flowchart of an example method 500 for decreasing the partition granularity of a cold database table. At 510, a cold database table is identified. In some embodiments, a cold database table is a table that is accessed less frequently than other tables. In some embodiments, a database table is determined to be infrequently accessed based on the number of times the table appears in a database system's plan cache, expensive statement report, or a combination thereof. For instance, if a table is absent from a database system's plan cache and/or expensive statement report, it may indicate that the table is infrequently accessed and is therefore a cold table.

In at least some embodiments, a cold database table is identified by measuring recent computing resource utilization that is attributable to multiple database tables and selecting the table to which the lowest percentage of the computing resource utilization is attributed. In embodiments where database tables can be partitioned across multiple sockets, the computing resource utilization can be measured on a per-socket basis, across sockets on a per-table basis, or some combination thereof.

At 520, it is determined whether or not the cold database table is partitioned across multiple sockets. If the cold table is partitioned, then at 530 the partition granularity of the cold table is decreased. The partition granularity of the cold table can be decreased by reducing the number of sockets across which the cold table is partitioned. For instance, part of the cold database table that is stored on one socket can be moved to another socket where another part of the cold table is already stored. If the cold database table is not partitioned across multiple sockets, then in some implementations the method returns to 510 and repeats (e.g., by identifying another cold database table).

In some embodiments, a partition of the cold database table is moved only after the cold table has qualified as a cold table for a certain period of time. In other embodiments, the decrease of the partition granularity of the cold table may be timed to coincide with another database operation, such as a scheduled reconstruction of the cold database table. In some embodiments, a previously scheduled reconstruction of the cold table can be adjusted so that the identified portion of the cold table is reconstructed on another socket that already contains another portion of the cold table.

Any of the methods described for decreasing the partition granularity of a cold database table may be repeated so that, with each repetition, the cold database table is partitioned across a decreasing number of sockets. In some embodiments, the partition granularity of a cold database table is decreased until either the table no longer qualifies as a cold table or only a single socket contains all or part of the cold table.

Example 6

Methods for Dynamically Balancing a Database Task Workload

In this section, example methods are described for dynamically balancing a workload by adaptively placing data items in a NUMA architecture. The techniques described in this section can be applied separately or in combination with techniques described elsewhere herein.

Figure 6:
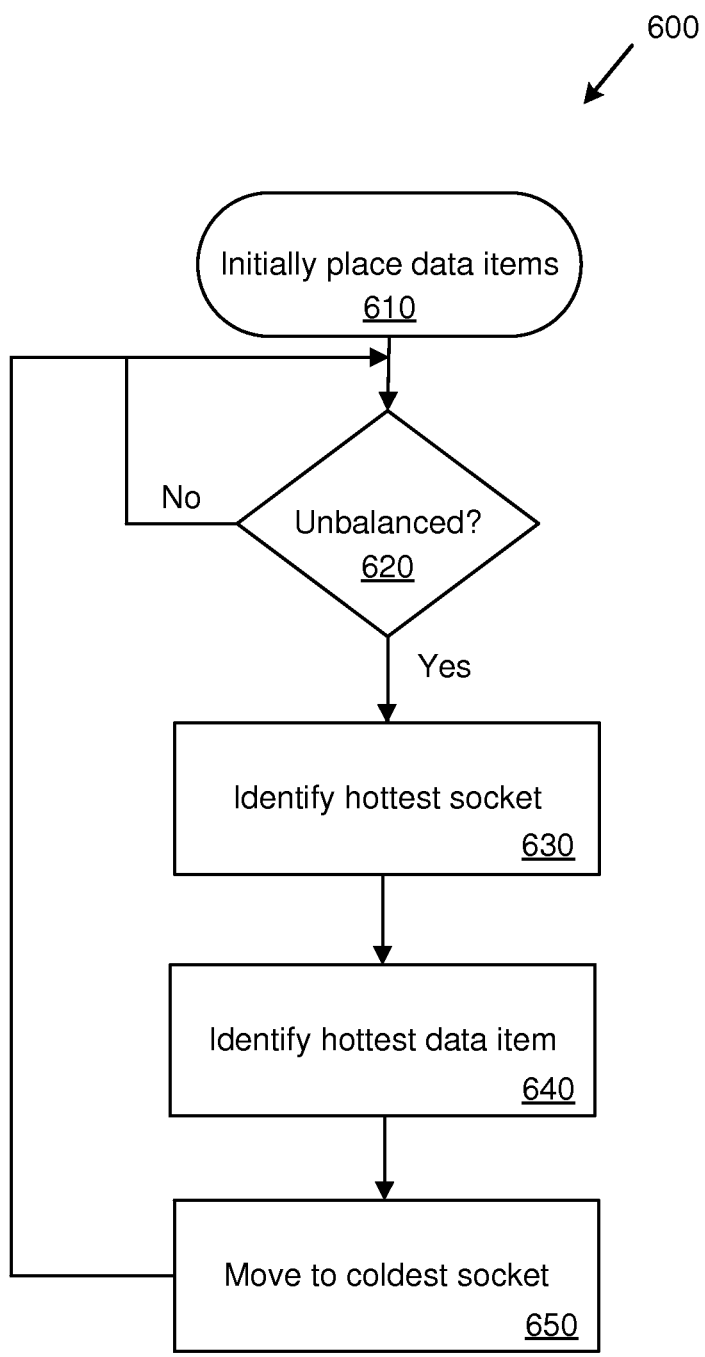
FIG. 6 is flowchart of an example method for dynamically balancing a workload by adaptively placing data items in a NUMA architecture.

FIG. 6 is a flowchart of an example method 600 for balancing data item placement across multiple sockets. At 610, data items are initially placed in the memory of several sockets organized in a NUMA architecture. The data items can be database tables, database table rows, database table columns, or any combination thereof. The data items can be placed in the memory of the sockets using any placement strategy. In one embodiment, the data items are placed in the memory of sockets in a round-robin fashion, wherein a first data item is placed in the memory of a first socket, a second data item is placed in the memory of a second socket, and so on until each socket contains a data item or there are no more data items to be placed. Then, if there are still data items to be placed, the process is repeated until there are no more data items left to be placed.

At 620, a check is made to determine whether or not a workload distributed among the sockets is unbalanced. In some implementations, the workload comprises database tasks that are performed by processors on the sockets using the data items that are stored in the memory of the sockets. In some embodiments, the workload can be considered to be unbalanced when a socket has a computing resource utilization (e.g. memory bandwidth utilization, or socket processor utilization) that is higher than that of other sockets. In some embodiments, the workload can be considered to be unbalanced when some, but not all, of the sockets are saturated, when some, but not all, of the sockets have a computing resource utilization that is above a threshold value, when database tasks are not evenly distributed across the sockets, or some combination thereof. If the workload is not unbalanced, the 620 is repeated. In some embodiments, there can be a delay before 620 is performed again.

If it was determined at 620 that the workload is unbalanced, then at 630 the hottest socket is identified. The hottest socket can the socket that is the most saturated, the socket that has been saturated for the longest period of time, the socket with a highest computing resource utilization, the socket where the most database tasks are executed, the socket containing the most frequently accessed data items, or any other metric that might indicate that the identified socket is the largest source of the imbalance in the workload.

At 640, the hottest data item on the hottest socket is identified. In some embodiments, the hottest data item is a data item stored on the hottest socket that is accessed the most frequently by database tasks executing on the hottest socket. For instance, the hottest data item may be the data item that is stored in the memory of the hottest socket and is involved in the highest number of scans, aggregations, or the like.

At 650, the hottest data item is moved to the coldest socket. The coldest socket can be the socket that is the least saturated, the socket with a computing resource utilization that is the lowest compared to the other sockets, the socket with the lowest average computing resource utilization over a period of time, the socket where the fewest database tasks are executed, the socket containing the least frequently accessed data items, or any other metric that might indicate that the identified socket is the most underutilized.

In some embodiments, the hottest data item is moved to the coldest socket only after the workload has remained unbalanced for a threshold period of time. In other embodiments, the move of the hottest table may be delayed until another database task is executed. For instance, if the hottest data item is a database table, the move of the table may be delayed until a task to rebuild the table is executed. If the data item is one or more database table columns, one or more database table rows, or a combination thereof, the move of the data item may be delayed until a database task is executed to rebuild the database table that owns the data item.

Figure 7:
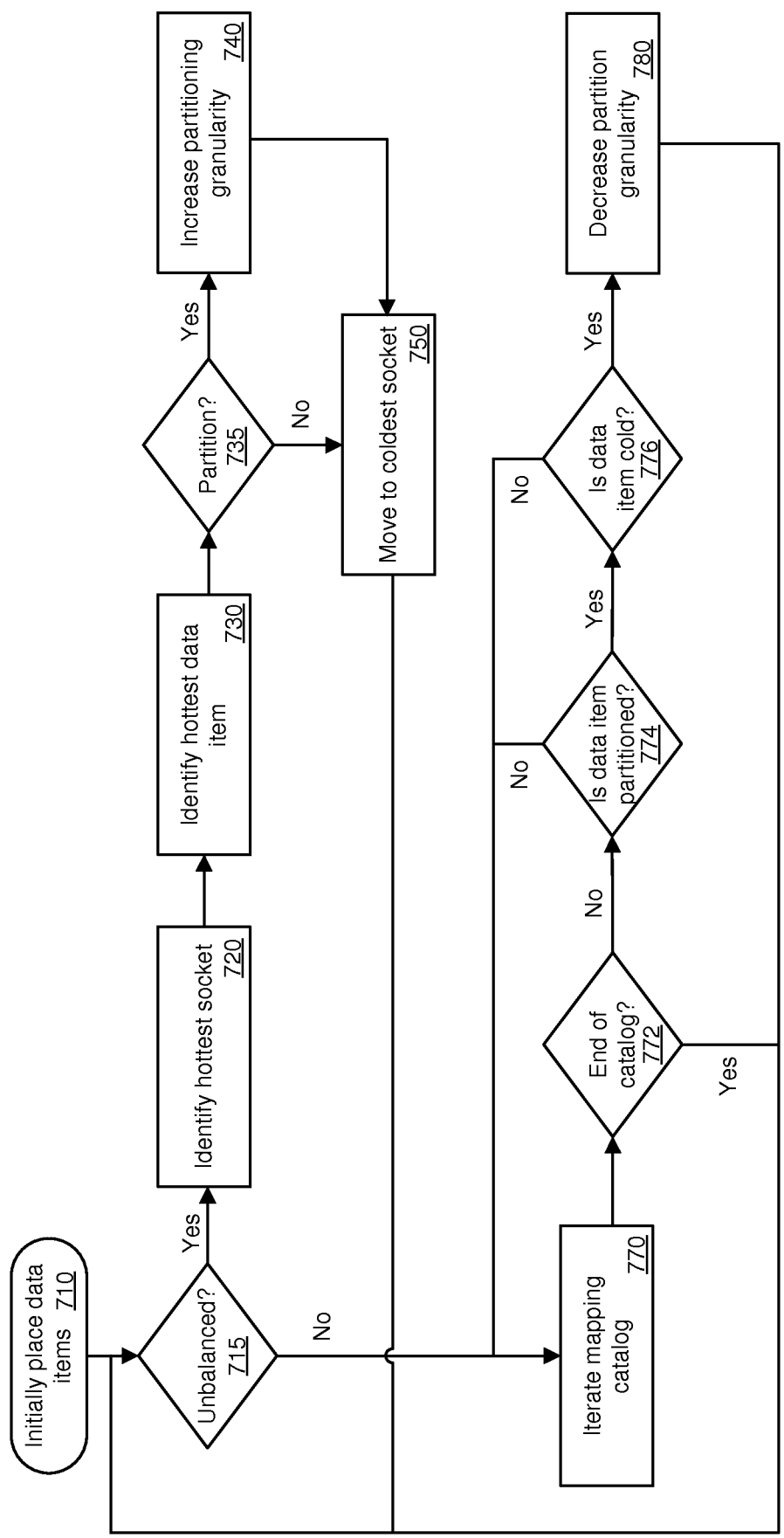
FIG. 7 is flowchart of another example method for dynamically balancing a workload by adaptively placing data items in a NUMA architecture.

FIG. 7 is a flowchart of an example method 700 for balancing a database task workload by adaptively moving and partitioning data items across multiple sockets. At 710, data items are initially placed in the memory of several sockets organized in a NUMA architecture. The data items can be database tables, database table rows, database table columns, or any combination thereof. The data items can be placed in the memory of the sockets using any placement strategy (for instance, round-robin placement).

In at least one embodiment, a task scheduler is used to schedule database tasks to be executed by the socket processors. When a task is created, it can designate an affinity for a particular socket. For instance, a socket affinity might be designated for a particular task because the task requires access to one or more data items stored in the socket's memory, and the task's performance may be improved by using local memory accesses to access the one or more data items.

In some implementations, a mapping catalog data structure can be used to track which sockets are storing data items, and which data items are stored. Entries in the mapping catalog may be organized to enable the look up of mapping records by data item, to enable the lookup of mapping records by socket, or a combination thereof. When a database task is created, the mapping catalog can be used to determine a socket affinity for the task. For instance, if a particular database task requires access to one or more data items, the mapping catalog can be used to identify the socket, or sockets, where the one or more data items are stored. If the database task's performance would be improved by executing it on one of the identified sockets, then the database task's socket affinity can be set to designate that socket.

The task scheduler can take the socket affinity of a database task into account when scheduling the task. For instance, the task scheduler can schedule the database task to be executed by a processor that belongs to the socket for which the task has designated an affinity. In some embodiments, the task scheduler may ignore a task's socket affinity when scheduling the task. For instance, if the designated socket is busy processing other database tasks, the scheduler may conclude that it is better to schedule the task to run on another socket instead of waiting on a processor on the designated socket to become available. In other embodiments, the task scheduler may schedule the task to be executed by a processor on the socket for which it has an affinity and then later, if the task has not been executed and processors on other sockets are idle, the task scheduler may re-schedule the task to be executed by a processor on another socket.

In some embodiments, when a database task is created, it can designate a hard affinity for a particular socket. In such a case, the task scheduler will only schedule the task to be executed by a processor on the designated socket and it will not re-schedule the task to be executed on another socket. For instance, if a database task requires access to one or more data items stored in a particular socket's memory and the task's performance would be greatly increased by accessing the one or more data items via local memory accesses, or if the task's performance would be greatly decreased by accessing the one or more data items via remote memory accesses, then the task may designate a hard affinity for the particular socket to ensure that it is not executed on any other socket.

At 715 it is determined whether or not the allocation of database tasks among the sockets has become unbalanced. In some embodiments, the allocation of tasks can be considered to be unbalanced when a socket has a computing resource utilization that is higher than other sockets, when some, but not all, of the sockets have a computing resource utilization that is above a threshold value, when database tasks are not evenly distributed across the sockets, or any combination thereof.

If the allocation of database tasks is determined to be unbalanced at 715, then at 720 a hottest socket is identified.

Once a hottest socket has been identified, then at 730 the hottest data item that is stored in the memory of the hottest socket is identified.

At 735, a decision is made to either move the hottest data item from the hottest socket to the coldest socket or to increase the partition granularity of the hottest data item and move only a part of the hottest data item from the hottest socket to the coldest socket. In some embodiments, the partition granularity of the hottest data item is increased if database tasks accessing the hottest data item are dominating the hottest socket's computing resource utilization. For instance, the decision may be made to increase the partition granularity of the hottest data item if 90% of the hottest socket's memory bandwidth utilization, CPU utilization, or a combination of the two, is attributable to database tasks involving the hottest data item. In other embodiments, the partition granularity of the hottest data item is increased if the hottest data item is accessed significantly more often than any other data item stored in the memory of the hottest socket. For instance, the decision may be made to increase the partition granularity of the hottest data item if it is accessed three times more frequently than any other data item stored on the hottest socket.

If the decision was made at 735 to increase the partition granularity of the hottest data item, then at 740 the partition granularity of the hottest data item is increased. If a data item was not previously partitioned, it can be thought of as having a partition granularity of 1, meaning that the data item is stored in the memory of one socket. A data item with a partition granularity of 2 is partitioned across two sockets, and so on. In some embodiments, the partition granularity of the hottest data item can be increased incrementally. For instance, if a data item begins with a partition granularity of 1, its partition granularity can be increased incrementally to 2. Similarly, if a data item began with a partition granularity of 2, its partition granularity can be increased incrementally to 3, and so forth. In other embodiments, the partition granularity of the hottest data item can be increased non-incrementally.

The manner in which the data item is partitioned can vary based on the type of data item. For instance, if the data item is a database table, then it can be partitioned using either a row-wise partition, a column-wise partition, or a combination of the two. If the data item is comprised of one or more database table columns, then it could be partitioned by subdividing the one or more columns Similarly, subdivision could be used to partition the data item if it comprised of one or more database table rows. In some implementations, partial columns and/or partial rows can be partitioned as well.

At 750, the hottest data item, or a partition of the hottest data item, is moved to the coldest socket. If the decision was made at 735 not to partition the hottest data item, then the hottest data item is moved to the coldest socket. If the decision was made at 735 to increase the partition granularity of the hottest data item, then a partition of the hottest data item is moved to the coldest socket. In some embodiments where a partition of the hottest data item is moved, the coldest socket must also be a socket that does not already contain a part of the hottest data item.

If, at 715, the allocation of database tasks is determined to not be unbalanced, then at 770 and 772 the records in the mapping catalog are iterated over. For each data item for which there is a record in the mapping catalog, 774-780 are performed.

At 774, a determination is made as to whether or not the current data item is partitioned. In some implementation, this can be done by inspecting the current data item's partition granularity. For instance, if the current data item has a partition granularity that is greater than 1, then the data item is partitioned.

If the data item is partitioned, then at 776 a determination is made as to whether the current data item is cold. In some implementations, the current data item is cold if a computing resource utilization that is attributable to the current data item is lower than the computing resource utilization attributed to other data items. In some implementations, the current data item is determined to be cold based on the number of times the table appears in a database system's plan cache, expensive statement report, or a combination thereof. In some implementations, the current data item is determined to be cold if the recent computing resource utilization that is attributable to it is significantly lower than that attributable to other data items.

If the current data item is partitioned and it is also cold, then at 780 the partition granularity of the current data item is decreased. In some embodiments, the partition granularity of the current data item is decreased incrementally. In other embodiments, the partition granularity of the current data item can be decreased non-incrementally. The partition granularity of the cold data item can be decreased by reducing the number of sockets across which the current data item is partitioned. For instance, part of the current data item that is stored on one or more sockets can be moved to another socket where another part of the current data item is already stored.

Example 7

Computing Systems

Figure 8:
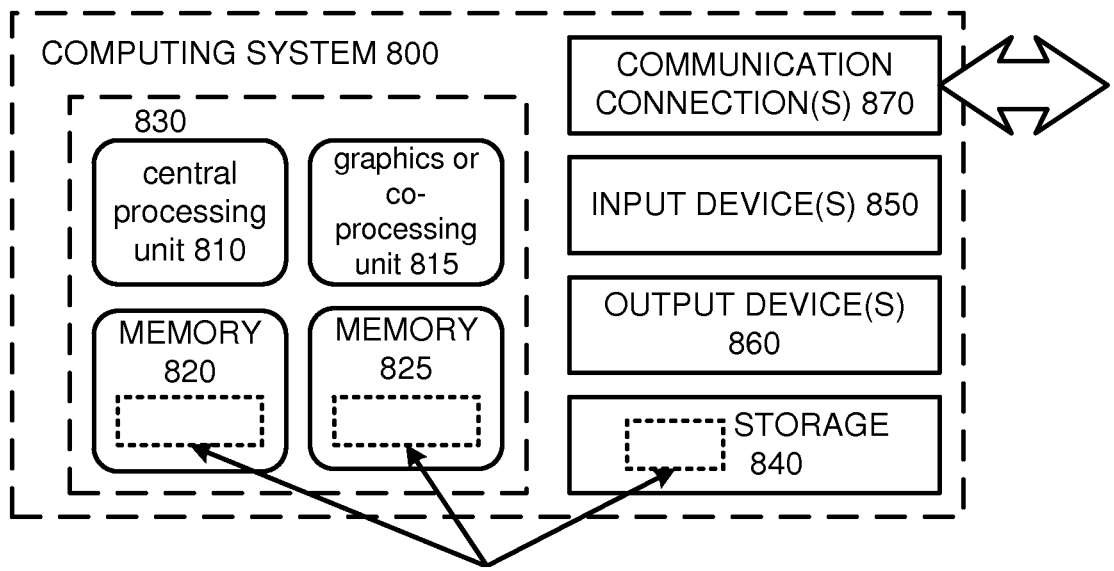
FIG. 8 is a diagram of an example computing system in which some described embodiments can be implemented.

FIG. 8 depicts a generalized example of a suitable computing system 800 in which the described innovations may be implemented. The computing system 800 is not intended to suggest any limitation as to scope of use or functionality, as the innovations may be implemented in diverse general-purpose or special-purpose computing systems.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 8

Cloud Computing Environment

Figure 9:
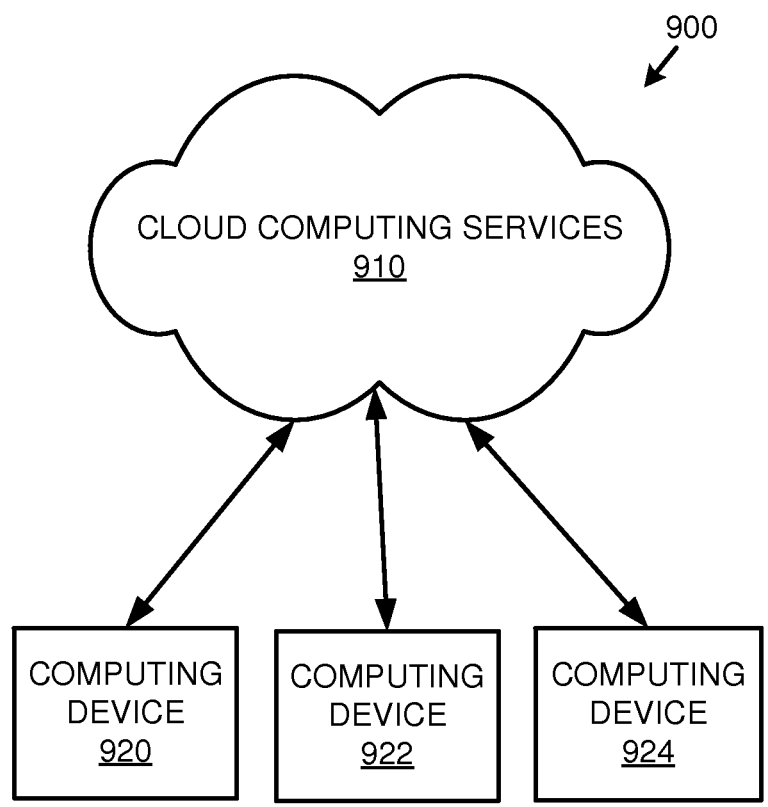
FIG. 9 is an example cloud computing environment that can be used in conjunction with the technologies described herein.

FIG. 9 depicts an example cloud computing environment 900 in which the described technologies can be implemented. The cloud computing environment 900 comprises cloud computing services 910. The cloud computing services 910 can comprise various types of cloud computing resources, such as computer servers, data storage repositories, networking resources, etc. The cloud computing services 910 can be centrally located (e.g., provided by a data center of a business or organization) or distributed (e.g., provided by various computing resources located at different locations, such as different data centers and/or located in different cities or countries).

The cloud computing services 910 are utilized by various types of computing devices (e.g., client computing devices), such as computing devices 920, 922, and 924. For example, the computing devices (e.g., 920, 922, and 924) can be computers (e.g., desktop or laptop computers), mobile devices (e.g., tablet computers or smart phones), or other types of computing devices. For example, the computing devices (e.g., 920, 922, and 924) can utilize the cloud computing services 910 to perform computing operators (e.g., data processing, data storage, and the like).

Example 9

Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 8, computer-readable storage media include memory 820 and 825, and storage 840. The term computer-readable storage media does not include signals and carrier waves. In addition, the term computer-readable storage media does not include communication connections (e.g., 870).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A method, implemented at least in part by a computing device, for adaptive database table placement, the method comprising:
    determining that one or more non-uniform memory access (NUMA) nodes in a server, comprising at least two NUMA nodes, are saturated, wherein each of the at least two NUMA nodes comprises a memory that is local to the NUMA node and at least one central processing unit; and
    for at least one saturated NUMA node, of the one or more saturated NUMA nodes, performing operations comprising:
    determining that a database table stored in the local memory of the saturated NUMA node is a frequently accessed database table, wherein determining that the database table stored in the local memory of the saturated NUMA node is a frequently accessed database table comprises:
        upon startup of a database system, executing a plurality of different database operations on a NUMA node of the at least two NUMA nodes to pre-compute memory bandwidth costs for each of the plurality of different database operations; and
        predicting memory bandwidth utilization for one or more database operations running against the database table based, at least in part, on the pre-computed memory bandwidth costs;
    determining that another NUMA node of the at least two NUMA nodes is not saturated; and
    moving a portion of the frequently accessed database table from the local memory of the saturated NUMA node to a local memory of the another NUMA node that is not saturated, wherein the moving the portion of the frequently accessed database table from the saturated NUMA node to the another NUMA node that is not saturated comprises moving a subset of columns of the frequently accessed database table from the saturated NUMA node to the another NUMA node; and
    performing, using the database system, a database task targeting the frequently accessed database table, wherein the performing the database task comprises using a central processing unit of the another NUMA node to access the portion of the frequently accessed database table stored in the local memory of the another NUMA node.

2. The method of claim 1, wherein the at least two NUMA nodes are organized in a non-uniform memory access architecture wherein, for a NUMA node of the at least two NUMA nodes:
    the at least one central processing unit of the NUMA node can access the local memory of the NUMA node that comprises the central processing unit at a first memory access rate; and
    the at least one central processing unit of the NUMA node can access the local memories of every other NUMA node, of the at least two NUMA nodes, at a memory access rate that is different from the first memory access rate.

3. The method of claim 1, wherein determining that the one or more NUMA nodes are saturated comprises:
    determining that the one or more NUMA nodes have a computing resource utilization above a threshold value.

4. The method of claim 3, wherein the computing resource utilization comprises a memory bandwidth utilization.

5. The method of claim 1, wherein determining that the one or more NUMA nodes are saturated comprises:
    determining that the one or more NUMA nodes have a highest computing resource utilization compared to all other NUMA nodes, of the at least two NUMA nodes.

6. The method of claim 1, wherein determining that the database table stored in the local memory of the saturated NUMA node is a frequently accessed database table comprises measuring a number of times the database table appears in a plan cache for a database.

7. The method of claim 1, wherein determining that the database table stored in the local memory of the saturated NUMA node is a frequently accessed database table comprises measuring a number of times the database table appears in an expensive statement report for a database.

8. The method of claim 1, wherein determining that the database table stored in the local memory of the saturated NUMA node is a frequently accessed database table comprises measuring recent average memory bandwidth used by at least one database table stored in the local memory of the saturated NUMA node.

9. The method of claim 1, wherein determining that the database table stored in the local memory of the saturated NUMA node is a frequently accessed database table comprises:
    identifying one or more database tables that are stored, at least in part, in the local memory of the saturated NUMA node;
    ranking the identified one or more database tables based on a computing resource utilization; and selecting a database table from the ranked one or more database tables based on the ranking.

10. The method of claim 9, wherein identifying database tables that are stored, at least in part, in the local memory of the saturated NUMA node comprises:
   accessing a mapping catalog data structure, wherein database tables are associated, at least in part, with one or more NUMA nodes, of the at least two NUMA nodes; and
   identifying one or more of the database tables that are associated, at least in part, with the saturated NUMA node in the mapping catalog data structure.

11. The method of claim 1, wherein the determining that one or more NUMA nodes in a server are saturated occurs after a determining that a computing resource utilization across the at least two NUMA nodes is unbalanced.

12. The method of claim 1, wherein the predicting memory bandwidth utilization for one or more database operations running against the database table based, at least in part, on the pre-computed memory bandwidth costs comprises:
   comparing a list of current and/or scheduled transactions for the database table to the pre-computed memory bandwidth costs for each of the plurality of different database operations.

13. The method of claim 1, wherein the plurality of different database transactions comprise a scan operation and an aggregation operation.

14. The method of claim 1, further comprising:
   scheduling the moving of the portion of the frequently accessed database table to coincide with a planned rebuild of the frequently accessed database table.

15. A server environment comprising:
   at least one computer server comprising at least two sockets, each of the at least two sockets comprising a memory and a central processing unit;
   a database system configured to perform operations using data stored in one or more database tables, wherein the one or more database tables are stored in one or more memories of one or more of the at least two sockets, wherein the operations are performed using one or more central processing units of the one or more of the at least two sockets where the database tables are stored;
   the server environment configured to perform operations for adaptive database table placement, the operations comprising:
      upon startup of the database system, execute a plurality of different database operations on a socket of the at least two sockets to pre-compute memory bandwidth costs for each of the plurality of different database operations;
      detect when one or more database operations involving a database table, of the one or more database tables, have saturated one or more of the at least two sockets, wherein the database table is stored at least in part on the one or more saturated sockets, and wherein detecting that the one or more database operations involving the database table have saturated one or more of the sockets comprises:
         predicting memory bandwidth utilization for the one or more database operations involving the database table based, at least in part, on the pre-computed memory bandwidth costs;
      mark the database table as a partitioning candidate database table;
      locate another socket, of the at least two sockets, where no part of the partitioning candidate database table is stored; and
      move part of the partitioning candidate database table from the one or more saturated sockets to the another socket, wherein the moving part of the partitioning candidate database table from the one or more saturated sockets to the another socket comprises moving a subset of columns of the partitioning candidate database table to the another socket.

16. The server environment of claim 15, wherein the at least two sockets are configured to allow at least one of the at least two sockets to access the memory of at least one other of the at least two sockets.

17. The server environment of claim 15, wherein the at least two sockets are configured to allow each socket, of the at least two sockets, to access memories of every other socket, of the at least two sockets, via one or more internal buses.

18. One or more non-transitory computer-readable storage media storing computer-executable instructions for causing a computing device to perform operations for adaptive database table placement, the operations comprising:
   monitoring a server comprising at least two sockets, wherein each socket comprises a memory and at least one processor;
   upon startup of a database system operating on the server, execute a plurality of different database operations on a socket of the at least two sockets to pre-compute memory bandwidth costs for each of the plurality of different database operations;
   identifying a socket, of the at least two sockets, with a computing resource utilization above a threshold value;
   identifying a most frequently accessed database table that is stored at least in part in the memory of the identified socket, wherein identifying the most frequently accessed database table comprises:
      predicting memory bandwidth utilization for one or more database operations involving the database table based, at least in part, on the pre-computed memory bandwidth costs;
   identifying another socket of the at least two sockets that meets the following criteria:
      the another socket does not have a computing resource utilization above the threshold value, and
      no part of the most frequently accessed database table is stored in the another socket's memory;
   moving part of the most frequently accessed database table to the memory of the another socket, wherein the moving part of the most frequently accessed database table to the another socket comprises moving a subset of columns of the most frequently accessed database table from the memory of the identified socket to the memory of the another socket; and
   performing, using a database system, one or more database tasks, wherein the performing the one or more database tasks comprises using a processor of the another socket to access the part of the frequently accessed database table in the memory of the another socket.

19. The one or more non-transitory computer-readable storage media of claim 18, wherein the moving the subset of columns of the database table comprises moving a single column of the database table to the memory of the another socket.

20. The one or more non-transitory computer-readable storage media of claim 18, wherein the moving the subset of columns of the database table comprises moving less than all of at least one column of the database table to the memory of the another socket.

* * * * *